(12) United States Patent
Amano

(10) Patent No.: US 8,024,160 B2
(45) Date of Patent: Sep. 20, 2011

(54) SYSTEM AND METHOD FOR FUEL PROCUREMENT PLANNING

(75) Inventor: Masami Amano, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 11/672,453

(22) Filed: Feb. 7, 2007

(65) Prior Publication Data

US 2007/0214031 A1   Sep. 13, 2007

(51) Int. Cl.
 G06F 17/50   (2006.01)
 G06Q 10/00   (2006.01)
 G06Q 30/00   (2006.01)
(52) U.S. Cl. ............ 703/2; 705/7.25; 705/330; 705/334
(58) Field of Classification Search .................. 705/412, 705/26, 27, 37 R, 80, 1.1, 7.11, 7.12, 7.13, 705/7.22, 7.23, 7.24, 7.25, 7.26, 7.27, 7.29, 705/28, 29, 30, 330, 334, 335, 348; 700/286, 700/291, 295; 703/2–4, 13
See application file for complete search history.

(56) References Cited

U.S. PATENT DOCUMENTS

| | | | |
|---|---|---|---|
| 6,915,268 B2 * | 7/2005 | Riggs et al. | 705/7.37 |
| 7,660,649 B1 * | 2/2010 | Hope et al. | 700/295 |
| 7,765,120 B2 * | 7/2010 | Yadappanavar et al. | 705/7.22 |
| 2003/0018490 A1 * | 1/2003 | Magers et al. | 705/1 |
| 2003/0041002 A1 * | 2/2003 | Hao et al. | 705/37 |
| 2008/0015721 A1 * | 1/2008 | Spearman | 700/99 |

OTHER PUBLICATIONS

Kristen et al., "Delivered Pricing and Merger with Demand Constratints" Jan. 2004, 12 pages.*

* cited by examiner

Primary Examiner — Igor Borissov

(74) Attorney, Agent, or Firm — Ido Tuchman; William J. Stock

(57) ABSTRACT

A procurement system may include a dual solution computation unit that creates a qualification problem limited to a delivery schedule and computes a dual solution for a qualification problem. The system includes a schedule search unit that creates a function that constrains a dual solution of constraint equations for a linear relaxation problem of the delivery schedules and searches for a delivery schedule exhibiting constraints that violate the dual solution of the qualification problem. The system further includes a schedule adding unit that creates a new qualification problem by adding and setting a delivery schedule and computes a dual solution to a new qualification problem using the dual solution computation. The system further includes an integer solution computation unit that outputs the number of delivery means and the amount of commodity to be purchased.

13 Claims, 10 Drawing Sheets

FIG. 2

Delivery Schedule k

| Period (Week) | 1 | 2 | 3 | 4 | 5 | 6 |
|---|---|---|---|---|---|---|
| Delivery state | Delivery * Depart | Delivery | Delivery * Arrive at 1 | Delivery | Completion * Return | Delivery * Depart again |

$\beta_{k,1,s,5} = 1$
$\delta_{1,k} = 50$

Delivery Schedule k

| Period (Week) | 7 | 8 | 9 | 10 | 11 | **** | T |
|---|---|---|---|---|---|---|---|
| Delivery state | Delivery | Delivery * Arrive at 2 | Delivery | Completion * Return | Delivery * Depart again | **** | Delivery |

$\beta_{k,2,s,10} = 1$
$\delta_{2,k} = 50$

|  Period<br>Scenario | 1 | 2 | 3 | 4 | 5 | ...... |
|---|---|---|---|---|---|---|
| 1 | 5 | 5 | 10 | 10 | 5 | ...... |
| 2 | 5 | 5 | 10 | 10 | 10 | ...... |
| 3 | 5 | 5 | 5 | 5 | 5 | ...... |
| 4 | 5 | 5 | 5 | 5 | 10 | ...... |

| s | Period / Delivery state | 1 | 2 | 3 | ...... | T |
|---|---|---|---|---|---|---|
| * | State(1, 1) | 5300 | 5005 | 5120 | | 100 |
| | State(1, 2) | 5300 | 5005 | 5005 | | 80 |
| | ⋮ | ⋮ | ⋮ | ⋮ | | ⋮ |
| | State(1, j) | 7050 | 7050 | 6900 | ...... | 50 |
| | ⋮ | ⋮ | ⋮ | ⋮ | | ⋮ |
| | State(1, J) | 5000 | 5000 | 5000 | | 40 |
| | State(2, 1) | 4250 | 4000 | 4000 | | 10 |
| | ⋮ | ⋮ | ⋮ | ⋮ | | ⋮ |
| | State(2, u) | 4300 | 4300 | 4300 | ...... | 10 |
| | ⋮ | ⋮ | ⋮ | ⋮ | | ⋮ |
| | State(2, U) | — | — | — | | 10 |
| ⋮ | | | | | ⋮ | |
| 1 | State(1, 1, 1) | 5000 | 5000 | 5000 | | 100 |
| | ⋮ | ⋮ | ⋮ | ⋮ | ...... | ⋮ |
| | State(1, 1, J) | 3800 | 3750 | 3700 | | 40 |
| | State(1, 2, 1) | 3000 | 2950 | 2900 | | 50 |
| | ⋮ | ⋮ | ⋮ | ⋮ | ...... | ⋮ |
| | State(1, 2, U) | — | — | — | | 0 |
| ⋮ | ⋮ | | | | ⋮ | |
| S | State(S, 1, 1) | 5000 | 5000 | 5000 | | 100 |
| | ⋮ | ⋮ | ⋮ | ⋮ | ...... | ⋮ |
| | State(S, 1, J) | 3800 | 3750 | 3700 | | 40 |
| | State(S, 2, 1) | 3000 | 2950 | 2900 | | 50 |
| | ⋮ | ⋮ | ⋮ | ⋮ | ...... | ⋮ |
| | State(S, 2, U) | — | — | — | | 0 |

US 8,024,160 B2

SYSTEM AND METHOD FOR FUEL PROCUREMENT PLANNING

CROSS-REFERENCE TO RELATED APPLICATIONS

This application claims priority under 35 U.S.C. §119 to Japanese Patent Application No. 2006-29610 filed Feb. 7, 2006, the entire text of which is specifically incorporated by reference herein.

BACKGROUND OF THE INVENTION

The present invention relates to a system for creating plans for procuring commodities from a supplier and delivering to a prospective consumer. Specifically, the present invention relates to a system that solves a mixed integer programming problem for creating such plans.

Conventionally, when businesses purchase commodities such as petroleum or natural gas, they create a purchasing plan using delivery means such as ships. The purchasing plan includes the purchase contract with the commodity supplier, the lease agreement for ships with the ship operator and an operating plan for the company ships owned by the business. In addition, it is preferable for the operating plan to be created so as to reduce the purchase costs for the commodity and the delivery costs as much as possible. The problem of creating such purchasing plans becomes complicated if the purchase contract, lease plan and operating plan are each created in parallel, and even if the calculations are done using an information processing device, there are cases where it is not completed in a realistic [amount of] time. Therefore, purchasing contracts, lease contracts and operating plans have conventionally been, for example, created successively in that order.

Moreover, there are cases where the problem of minimizing costs under certain constraints may modeled as a linear programming problem and a mixed integer programming problem. See *Optimization Handbook: Nemhauser*, G. L., Rinnooy Kan, A. H. G., Todd, M. J. ed., Asakura Publishing Co., Ltd., 1995 for a typical method of solution for linear programming problems.

However, the purchasing contracts, lease contracts and operating plans are interrelated, and if one of them is determined first, there have been cases where purchasing costs and delivery costs could not be minimized for the purchasing contract as a whole. In addition, when the demand for the commodity changes during the planning period, it is preferable for the purchasing plan to change suitably. However, if one attempts to create a purchasing plan that takes into consideration the effects of such changes in demand, the time for the calculating using an information processing device for that creation becomes even longer. Thus, it has conventionally been impossible to create a purchasing plan that minimizes costs in a realistic amount of time.

BRIEF SUMMARY OF THE INVENTION

Exemplary aspects of the present invention provide a system, method and program capable of solving the problems described above. This can be achieved by combining the features in the independent items in the claims. Furthermore, the dependent items provide more advantageous specific examples of the present invention.

A first mode of the present invention for solving the problems described above is a system for creating plans for procuring commodities from a supplier and delivering to a prospective consumer, wherein, for a mixed integer programming problem that has as variables the number of delivery means for delivering the commodities according to the delivery schedule for each and the amount of the commodities purchased from supplier for each and minimizes the value of a first objective function that computes the expected value for delivery costs and purchasing costs, there is provided a dual solution computation unit that in a linear relaxation problem for the mixed integer programming problem, creates a qualification problem that is limited to at least one preset delivery schedule and computes a dual solution for that qualification problem, a schedule search unit that creates a second objective function based on a constraint equation that constrains the dual solution of the constraint equations for the dual problem of the linear relaxation problem by the delivery schedules and searches for a delivery schedule exhibiting the constraints that violate the dual solution of the qualification problem by solving a dynamic programming problem having a recursive equation that shows the changes in the second objection function value for the changes in the delivery states, a schedule adding unit that creates a new qualification problem by adding and setting the delivery schedule that has been found in the qualification problem with the finding of the delivery schedule as a condition and computes a dual solution to that new qualification problem using the dual solution computation part, and an integer solution computation unit that computes and outputs of the number of the delivery means and the amount of the commodity to be purchased by solving the mixed integer programming problem based on the solution of the qualification problem with the delivery schedule not being found as a condition, and a method for creating a delivery plan using that system and a program that makes an information processing device function as that system are provided.

Moreover, the outline summary of the invention above does not enumerate all of the required characteristics for the present invention, and sub-combinations of these groups of characteristics may also be the invention.

According to the present invention, a delivery plan that minimizes the delivery cost and purchase cost for a commodity may be created more efficiently than up to now.

BRIEF DESCRIPTION OF THE SEVERAL VIEWS OF THE DRAWINGS

FIG. 2 shows a specific example for the delivery schedule k.

FIG. 10 shows the details of the processing in S820.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
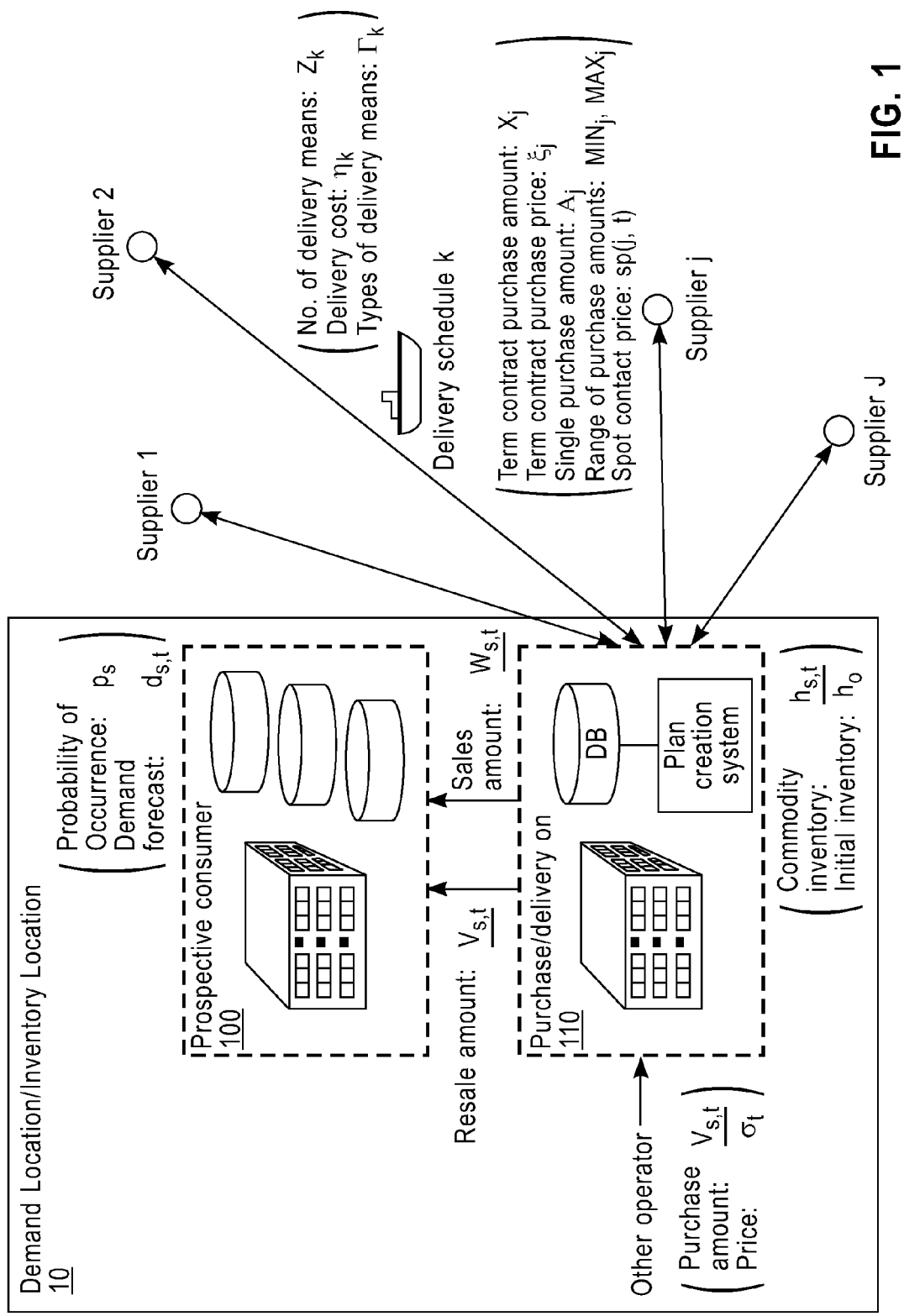
FIG. 1 is a conceptual diagram of the work in purchasing a commodity, delivering to the location of demand and selling to a prospective consumer.

FIG. 1 is a conceptual diagram of the work in purchasing a commodity, delivering to the location of demand 10 and selling to a prospective consumer 100. A mixed integer programming problem for minimizing a first objective function showing an expected value for the delivery cost and purchase cost of the commodity will be defined using FIG. 1. In the diagram, the underlined parameters are variables for the mixed integer programming problem, and the parameters that are not underlined are constants given in advance.

The prospective consumer 100 and delivery company 110 are present at the location of demand 10 for the commodity. The delivery company 110 purchases the commodity from each of a plurality of suppliers established as locations that differ from the location of demand 10 and deliver the purchased commodity to the location of demand 10. Furthermore, the delivery company 110, stores or sells to the prospective consumer 100 reserves of the commodity at the location of demand 10. When the purchased commodity does not meet the demand, the delivery company 110 purchases the commodity from other traders present at the location of demand and resells it to the prospective consumer 100.

Letting the plurality of suppliers located at locations that differ from the location of demand 10 be suppliers 1 through J, the period required for transporting the commodity from each of the suppliers to an inventory location differs for each supplier. In the following a description of supplier j, which is representative of these suppliers, will be given. The type of contract between the delivery company 110 and the supplier j shall be of two types, a term contract and a spot contract. A term contract is a contract where total purchase amount $x_j$ and price $\xi_j$ for planning period (for example, annual) are determined in advance. A spot contract is a contract where, during the planning period, the purchase amount and the price for that period sp (j, t) are determined for a certain period in a plurality of periods included in the planning period. Here, t is the period and is any period within the plurality of periods (1-T) included in the planning period. In addition, the delivery means may purchase the commodity at each arrival at the supplier j, and the purchase amount for delivery means 1 is $A_j$. However, when the commodity has volatility as with petroleum and natural gas, $A_j$ is the amount at the location of demand 10 where volatilized portion has been subtracted. In addition, the range of the total amount of the commodity that may be purchased through the contract with the supplier j during the entire planning period is determined by the lower limit value $MIN_j$ and the upper limit value $MAX_j$.

In addition, the type of delivery schedule by the delivery means shall be delivery schedules 1-K. Actually, the delivery schedules are defined in combination with the changes in the state of the delivery means according to the progress of the period. Specifically, a delivery schedule is the series of operations where the delivery means (for example ship, airplane, truck or the like) heads toward some designates supplier, purchases the commodity and returns to the location of demand 10. Therefore, the number of delivery schedules that can be envisioned is very large, and making calculations for all of them is not realistic. However, for convenience in the description, the delivery schedule is set to delivery schedules 1 through K where it is assumed that all of the delivery schedules are identified in FIG. 1.

A description will be given of any delivery schedule k. The number of delivery means delivering the commodity through delivery schedule k is $z_k$. For example, when the delivery means is a ship, $z_k$ is the collective number of ships. In addition, the delivery cost required for each delivery means in delivery schedule k is $\eta_k$. In addition, the types of delivery means according to delivery schedule k are represented by $\Gamma_{g, k}$. The delivery means type g is of three types, routine runs, charter runs and runs by the company itself. When the delivery means is ship, these three types are regular ships, charter ships and the company's own ships. Regular ships only deliver the commodity supplied by the term contract. In addition, regular ships shall assume delivery states determined in advance regardless of the demand scenario. That is, the delivery schedule for regular ships cannot be changed according to demand trends during the planning period. In addition, these types of delivery means have different fee schedules for the delivery cost. That is, the delivery cost for regular runs is determined in advance for the entire planning period, and is fixed regardless of the delivery states for each of the periods.

On the other hand, the delivery costs are determined for each period of operation for charter ships and regular ships.

Charter ships and the company's own ships each deliver the commodity being supplied according to a term contract or a spot contract. That is for example, each of the charter ships and the company's own ships may deliver the commodity for a term contract in a certain period and may deliver the commodity for a spot contract in another period. This case also shall assume delivery states determined in advance regardless of the demand scenario. In addition, each of the charter ships and the company's own ships may deliver only the commodity supplied according to spot contracts. In this case, operations may change during the planning period according to the demand scenario. Moreover, 1 is assumed for parameter $\Gamma_{g,k}$ when the delivery means for delivery schedule k is g and 0 is assumed when it is not g.

The inventory amount for the beginning of the planning period for the delivery company 110 is $h_o$. In addition, with period t and a demand scenario of s, the inventory amount of the commodity that for which delivery from the supplier to the delivery company 110 has been completed but has not been sold to the prospective consumer 100 is $h_{s,t}$. In addition, the purchase amount for the commodity that the delivery company 110 purchases from other operators present at the location of demand 10 is $v_{s,t}$, and the purchase price therefore is $\sigma_t$. In addition, the amount sold by the delivery company 110 selling to the prospective consumer 100 of the commodity purchased from each of the suppliers in a certain period t is the variable $w_{s,t}$. Furthermore, the amount of the commodity purchased from other operators that the delivery company 110 sells to the prospective consumer 100 is the same as the purchase amount and is $v_s$, t. In addition, the plurality of demand scenarios predicted in advance are 1 through S, and the probability of any demand scenario s happening is $p_s$. In addition, the predicted demand in any demand scenario s period t is $d_{s,t}$.

In addition, a plan creation system 40 and an environment database 30 are provided at the delivery company 110. The plan creation system 40 creates a plan for delivering the commodity that the delivery company 110 purchases from the suppliers to the prospective consumer 100. In addition, the environment database 30 records the various parameters used in creating the plan, and specifically, records the parameters that are not underlined. However, the parameters for the delivery schedule k are limited to those for some of the schedules out of all of the delivery schedules that can be envisioned.

FIG. 2 shows a specific example for the delivery schedule k. The delivery schedule k shows a combination of delivery states for the delivery means corresponding to each of the plurality of periods included in the planning period. The delivery states in each period show whether the delivery of the commodity has been completed within that period. For example, it is the condition of in-progress deliveries for which the delivery means has left the location of demand 10 in the first week of the planning period (year). In the third week, the delivery means reaches the supplier 1 and loads the commodity. Then, in the fifth week, the delivery means unloads the commodity for the period [error?, should be "returns to"?] at the location of demand 10 Furthermore, the delivery means leaves the location of demand 10 again in the sixth week and arrives at the supplier 2 in the eighth week. The delivery means loads the commodity there, and returns to the location of demand 10 in the tenth week.

The parameter β shows the delivery state for the delivery means following the delivery schedule k. Specifically, $\beta_{k,j,s,t}$ is assumes [a value of] 1 when the purchase from the supplier j by the delivery means following delivery schedule k with demand scenario s in period t has been completed, and when that purchase has not been completed, it assumes [a value of] 0. Therefore, in the example in FIG. 2, $\beta_{k,1,s,5}=1$ and $\beta_{k,2,s,10}=1$. From the first week through the fourth wee, and from the sixth week through the ninth week, $\beta_{k,j,s,t}=0$.

The parameter δ shows the delivery amount of the commodity for the delivery means following the delivery schedule k. Specifically, $\delta_{j,k}$ shows the total amount of the commodity purchased from the supplier j by one delivery means following delivery schedule k for the entire planning period. When only one purchase is made from the supplier 1, that one purchase amount (for example, 5o tons) in the fifth week is $\delta_{1,k}$. In the same manner, when only one purchase is made from the supplier 2, the purchase amount in the tenth week is $\delta_{2,k}$.

Figures 3, 4:
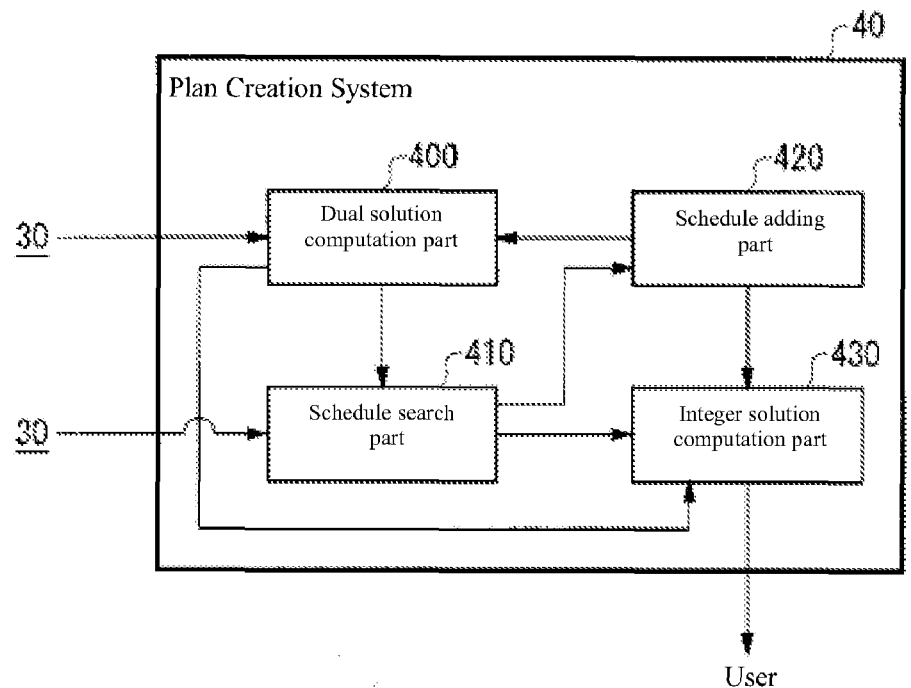
FIG. 3 shows an example of the data structure for the environment database 30.
FIG. 4 shows the functional structure of the plan creation system 40.

FIG. 3 shows an example of the data structure for the environment database 30. The environment database 30 records a plurality of demand scenarios in addition to the constant parameters described with reference to FIG. 1 and FIG. 2. Each of the plurality of demand scenarios determines the demand for the commodity in each of the plurality of periods included in the planning period. In the example in FIG. 3, the environment database records four demand scenarios. Each of the demand scenarios shows the demand for the prospective consumer 100 for each period from the first through the fifth.

For example, in the first demand scenario, the demand for each period from the first through the fifth is, in that order, 5, 5, 10, 10 and 5. In addition, for example, in the second demand scenario, the demand for each period from the first through the fifth is, in that order, 5, 5, 10, 10 and 10. In addition, for example, in the third demand scenario, the demand for each period from the first through the fifth is, in that order, 5, 5, 5, 5 and 5. In addition, for example, in the fourth demand scenario, the demand for each period from the first through the fifth is, in that order, 5, 5, 5, 5 and 10.

In this example, the demand in both the first demand scenario and the second demand scenario at the time of the first period are the same at 5, and the delivery company cannot distinguish between the first demand scenario and the second demand scenario. In the mixed integer programming problem for the present embodiment, a constant parameter B showing that these scenarios cannot be distinguished is introduced. B (s, s, t) is assigned 0 when a demand scenario s is distinguished from another demand scenario s' in the period t, and when it is not distinguished, 1 is assigned. For example B(1, 2, 1)=1. In addition, the third demand scenario and the fourth scenario cannot be distinguished in the third period, so B(3, 4, 3)=1. In addition, the third demand scenario and the fourth scenario can be distinguished in the fifth period, so B(3, 4, 5)=0.

The mixed integer programming problem becomes the problem of minimizing the value for the first objective function shown in Equation (1) below for the parameters described referring to FIG. 1 through FIG. 3 above.

$$\text{minimize} \sum_{j=1}^{J} \xi_j \cdot x_j + \sum_{k=1}^{K} \eta_k \cdot z_k + \sum_{s=1}^{S} \sum_{t=1}^{T} p_s \cdot \sigma_t \cdot v_{s,t} \quad (1)$$

However, the mixed integer programming problem has the following constraints for delivery of the commodity.

1. Demand and Supply Agreement Constraint

This constraint shows that when the amount of commodity purchased from the suppliers that is sold to the prospective consumer is added to the amount for the commodity purchased from other operators and resold for each period, it should be equal to the demand for that period. This constraint is expressed by Equation (2) below.

$$v_{s,t}+w_{s,t}=d_{s,t}, \text{ for } 1\leq t\leq T, 1\leq s\leq S. \quad (2)$$

2. Inventory Transition Constraint

This constraint shows that, in each of the plurality of periods and in each of the plurality of demand scenarios, the value when the amount of the commodity sold to the prospective consumer is subtracted from the amount of the commodity for which delivery has been completed by the delivery means in the period in question should be equal to the increase in the inventory amount for the commodity in that period. This constraint is expressed by Equation (3) below.

$$(1-E)h_{t-1,s} + \sum_{j=1}^{J} A_j \sum_{k=1}^{K} \beta_{i,j,k,s} z_k - w_{s,t} - h_{s,t} = 0, \quad (3)$$

$$\text{for } 1 \leq t \leq T, 1 \leq s \leq S \text{ provided, } h_{s,0} = h_0 \text{ for } 1 \leq s \leq S)$$

However, when the commodity being delivered has volatility like petroleum and natural gas, the commodity decreases over the passage of the period during both delivery and storage. E is the rate of reduction per period.

3. Constraint on Total Number of Delivery Means

The upper limit number for total number of delivery means used in each delivery schedule for each type of delivery means shall be determined in advance. This upper limit number is $N_g$. As has already been discussed g shows the type of delivery means. The constraint on the total number of delivery means shows that for each type of delivery means, the total number of that delivery means used in each delivery schedule should be equal to or less than this upper limit number $N_g$. This constraint is expressed by Equation (4) below.

$$\sum_{k=1}^{K} \Gamma_{g,k} \cdot z_k \leq N_g, \quad (4)$$

for $g \in$ {liner ship, chartered ship, own ship}.

4. Term Contract Amount Agreement Constraint

This constraint shows that the amount of the commodity purchased from each supplier should be equal to the amount of the commodity that is delivered by the one delivery means according to each delivery schedule multiplied by the number of delivery means delivering that commodity according to that delivery schedule. This constraint is expressed by Equation (5) below.

$$\sum_{k=1}^{K} \delta_{j,k} \cdot z_k = x_j \text{ for } 1 \leq j \leq J. \quad (5)$$

5. Purchase Amount Constraints

In addition, a range is provided for the total amount of the commodity supplied by each supplier according to term contracts. The constraints based on this range are expressed by Equation (6) and Equation (7) below.

$$x_j \geq MIN_j \text{ for } 1 \leq j \leq J. \quad (6)$$

$$x_j \leq MAX_j \text{ for } 1 \leq j \leq J. \quad (7)$$

6. Unpredictability Constraint

In addition, the demand scenario shall be unpredictable. That is, for a plurality of demand scenarios that cannot be distinguished at the time of the period t, the same deliveries are carried out from period 1 through period t for all demand scenarios. The constraints in Equation (8) and Equation (9) below are derived from this.

$$v_{s,t}=v_{s',t} \text{ for } 1\leq s,s'\leq S, 1\leq t\leq T, s\neq s', B(s,s',t)=1. \quad (8)$$

$$w_{s,t}=w_{s',t} \text{ for } 1\leq s,s'\leq S, 1\leq t\leq T, s\neq s', B(s,s',t)=1. \quad (9)$$

7. Range of Values for Variables

The range of values for each of the variables is determined as follows.

$$x_j \geq 0, z_k: \text{ nonnegative integer, } v_{s,t} \geq 0, w_{s,t} \geq 0, h_{s,t} \geq 0. \quad (10)$$

FIG. 4 shows the functional structure of the plan creation system 40. The plan creation system 40 has a dual solution computation unit 400, a schedule search unit 410, a schedule adding unit 420 and an integer solution computation unit 430. A solution method for the mixed integer programming problem will be described in the following with reference to FIG. 4, but the basic idea thereof is in general as follows. As has already been discussed, the delivery schedule is a combination of delivery states, so the number of types thereof is very large. Therefore, in the present embodiment, a qualification problem that limits the delivery schedule to at least one delivery schedule that can be used in the delivery of the commodity and which has been established in advance. Furthermore, when that qualification problem is added and another schedule that improves the solution is searched for and found, that is added to the qualification problem and the qualification problem is solved again. This is repeated until no delivery schedule that improves the solution is found.

The determination of whether an optimal solution has been calculated or not may be achieved as a rapid process by using the duality theorem. Specifically, according to the duality theorem, the solution to the qualification problem is the same as the solution to linear relaxation problem that is the basis when "a dual solution for a qualification problem is a solution that can be executed for a dual problem for the linear relation problem that is the basis." That is, a determination can be made by finding the dual solution to the qualification problem and confirming that the constraints for the linear relaxation problem are satisfied. This determination can be achieved by rapid processing using dynamic programming. These processing functions will be described specifically in the following.

The dual solution computation unit 400 generates a qualification problem where the delivery schedule that can be used to deliver the commodity is limited to at least one delivery schedule established in advance and computes a dual solution for that qualification problem for the linear relaxation problem for the mixed integer programming problem. In other words, there is no need to establish all possible delivery schedules in advance in the problem described above, and a small number of delivery schedules may be set in advance. Therefore, the calculation processing by the dual solution computation unit 400 is completed very rapidly.

The dual solution calculated by the dual solution computation unit 400 is expressed as follows. The dual solution corresponding to the agreement constraint for demand and supply is expressed by the variable $\mu_s$, and the dual solution corresponding to the inventory transition constraint is $\pi_{s,t}$. These dual solutions are calculated for each period and each demand scenario. In addition, the dual solution corresponding to the constraint on the total number of delivery means is expressed by the variable $\lambda_g$. In addition, the dual solution corresponding to the agreement constraint for the term contract amount is expressed by the variable $\theta_j$, the dual solution corresponding to the constraint determining the upper limit for the term contract amount by the variable $\phi_j$, and the dual solution corresponding to the constraint determining the lower limit of the term contract amount by $\Phi_j$. These dual solutions are calculated for each supplier j. In addition, the dual solution corresponding to the constraint showing that the amount of the commodity purchased from other operators is unpredictable is expressed by the variable $\chi_{s,s',t}$, and the dual solution corresponding to the constraint showing that the amount of the commodity purchased from the suppliers that is sold to the prospective consumer is unpredictable is expressed by the variable $\Psi_{s,s',t}$.

The objective function for the dual problem for the linear relaxation problem that is the basis is shown by the following Equation (11), and the constraint equations included in the dual problem for the linear relaxation problem that is the basis are shown by Equation (12) through Equation (16).

$$\text{maximize} \sum_{s,t} d_{s,t} \cdot \mu_{s,t} - \sum_g N_g \cdot \lambda_g + \sum_j (\text{MIN}_j \cdot \phi_j - \text{MAX}_j \cdot \Phi_j) \quad (11)$$

$$-\theta_j + \phi_j - \Phi_j \le \xi_j \text{ for each } j. \quad (12)$$

$$\sum_{t=1}^{T}\sum_{s=1}^{S}\sum_{j=1}^{J} A_j \beta_{k,j,s,t} \cdot \pi_{s,t} - \sum_g \Gamma_{g,k} \cdot \lambda_g + \sum_{j=1}^{J} \delta_{j,k} \cdot \theta_j \le \eta_k, \quad (13)$$

$$\text{for } 1 \le k \le K$$

$$\mu_{s,t} + \sum_{s':s\ne s',B(s,s',t)=1} \chi_{s,s',t} - \sum_{s':s\ne s',B(s',s,t)=1} \chi_{s',s,t} \le p_s \cdot \sigma_t, \quad (14)$$

$$\text{for each } s, t.$$

$$\mu_{s,t} - \pi_{s,t} + \sum_{s':s\ne s',B(s,s',t)=1} \Phi_{s,s',t} - \sum_{s':s\ne s',B(s',s,t)=1} \Phi_{s',s,t} \le 0, \quad (15)$$

$$\text{for each } s, t.$$

$$(1-E)\pi_{s,t+1} - \pi_{s,t} \le 0, \text{ for each } s, t. \quad (16)$$

Moreover, the value range for the variable showing the dual solution is as in Equation (17).

$$\mu_{s,t}, \pi_{s,t}, \theta_j, \chi_{s,s',t}, \Phi_{s,s',t}: \text{real number}, \lambda_g, \Phi_j, \phi_j \ge 0 \quad (17)$$

Here, the dual problem for the qualification problem is different from the dual problem for the linear relaxation problem that is the basis in that all of the delivery schedules are not processing targets. Specifically, in Equation (13) above, the range of values for the variable k showing the delivery schedules is narrower a preset range rather than being from 1 to K. That is, the constraint included in the dual problem for the qualification problem is smaller than the constraint included in the dual problem for the linear relaxation problem. Therefore, the dual solution for the qualification problem may violate the constraint shown in Equation (13). By searching for a delivery schedule that violates the constraint in this Equation (13), the schedule search unit 410 confirms the dual solution of the qualification problem as to whether the solution of the qualification problem is the solution of the linear relaxation problem.

Specifically, the schedule search unit 410 first generates the second objective function based on Equation (13). Moreover, Equation (13) is constrains the dual solution by the delivery schedule. That is, β, δ, Γ and the delivery cost η are values determined by the delivery schedule, and Equation (13) forms an inequality that constrains the dual solution using these parameters. The schedule search unit 410 expresses this constraint as an inequality that makes the function value a constant value or greater, and sets the equation where the dual solution of the qualification problem is substituted into this function as the second objective function. Specifically, the schedule search unit 410 may generate an equation where the left side of the equation is subtracted from the right side of the equation in Equation (13) for the second objective function.

This second objective function includes an equation that constrains the dual solution $\pi_{s,t}$ calculated for each period and each demand scenario based on the delivery schedule in the first term. In addition, this objective function not only includes the first term that constrains dual solution $\pi_{s,t}$ corresponding to the inventory transition constraint, but further includes a second term that constrains the dual solution $\lambda_g$ corresponding to the constraint on the total number of delivery means and a third term that constrains the dual solution $\theta_j$ corresponding to the agreement constraint for the term contract amount.

Next, the schedule search unit 410 searches for a delivery schedule that exhibits a constraint that the dual solution for the qualification problem violates by solving the dynamic programming problem that has the recursive equation showing the change in the value of the second objective function for the change in the delivery state. The details of the search method will be described later, but roughly it is as follows. The value for the second objective function which is based on the delivery state from a certain period t to T which is the final period of the planning period is defined by the value for the second objective function which is based on the delivery state from the period t+1 that follows that period t to the period T. This definition is set as a recursive equation for the dynamic programming problem. Furthermore, the schedule search unit 410 calculates the delivery state that minimizes the value for the second objective function in each period backwards successively from period T to period 1. Furthermore, the combination of delivery states for which the value for the second objective function in period 1 is the smallest is selected, and that is set as the delivery schedule to be found.

The schedule adding unit 420 sets the finding of a delivery schedule as a condition, adds that delivery schedule to the qualification problem and generates a new qualification problem by establishing it. Furthermore, the schedule adding unit 420 has the dual solution for this new qualification problem calculated by the dual solution computation unit 400. The integer solution computation unit 430 computes and outputs the number of delivery means and the amount of the commodity to be purchased by solving the mixed integer programming problem based on the solution for the qualification problem with the condition of a delivery schedule not being found.

Figure 5:
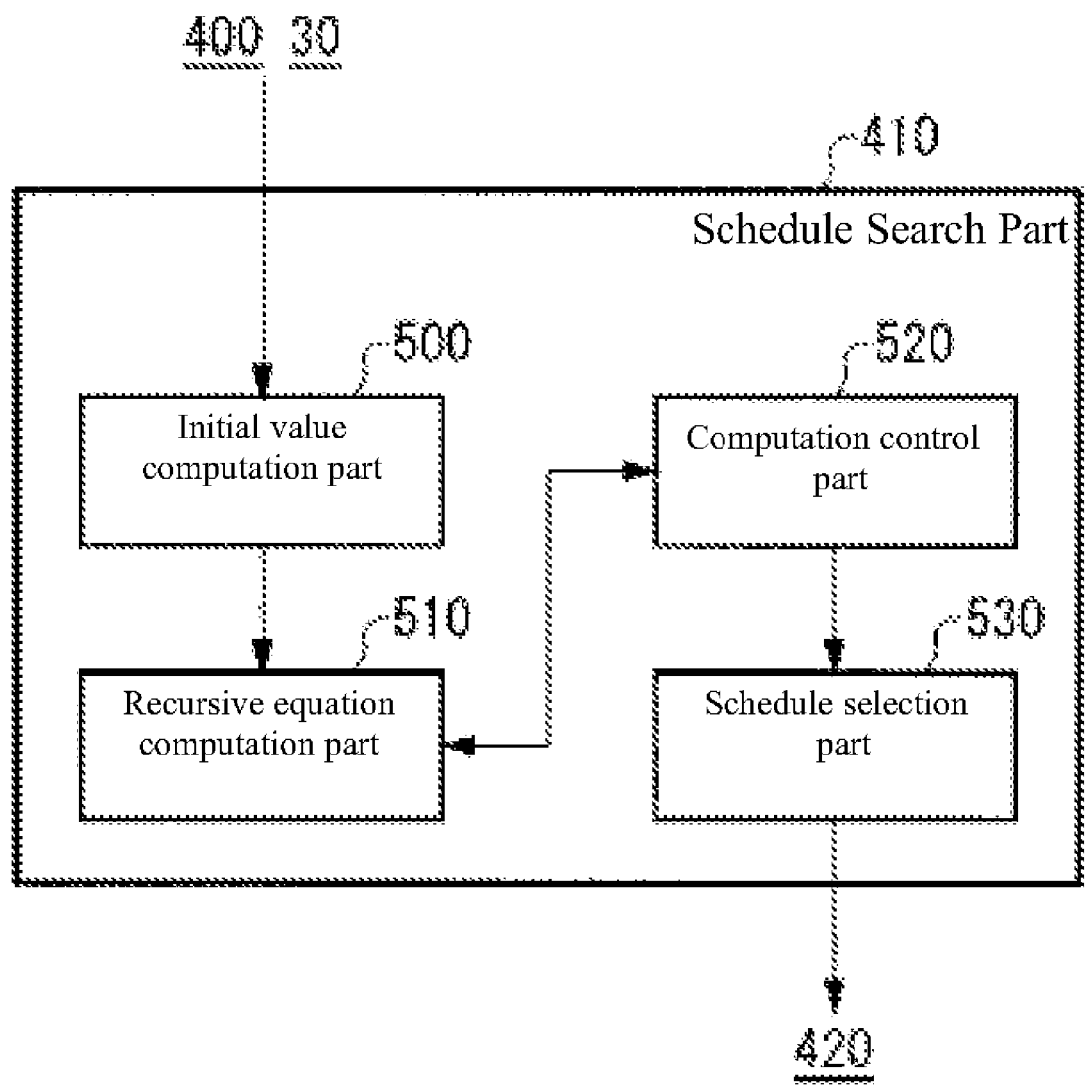
FIG. 5 shows the functional structure for the delivery schedule search unit 410.

FIG. 5 shows the functional structure for the delivery schedule search unit 410. The schedule search unit 410 has an initial value computation unit 500, a recursive equation computation unit 510, a computation control unit 520 and a schedule selection unit 530. The initial value computation unit 500 computes the value for he second objective function that is calculated based on the delivery state of the delivery means in the final period T of the plurality of periods included in the planning period. Based on the recursive equation, the recursive equation computation unit 510 computes the minimum value for the second objective function which is calculated based on the delivery state from a certain period t in the planning period to the final period T based on the minimum value for the second objective equation which is calculated based on the delivery state from the period t+1 following this period t to period T.

The computation control unit 520 makes the initial value computation unit 500 compute the value for the second objective function in each delivery state and has the value for the second objective function in the case where each delivery state is set in the delivery means for each period calculated sequentially by the recursive equation computation unit 510 from period T to the initial period of the planning period. The schedule selection unit 530 selects the combination of delivery states set in each period for minimizing the value of the second objective function for the first period of the planning period as the delivery schedule to be found.

Figure 6:
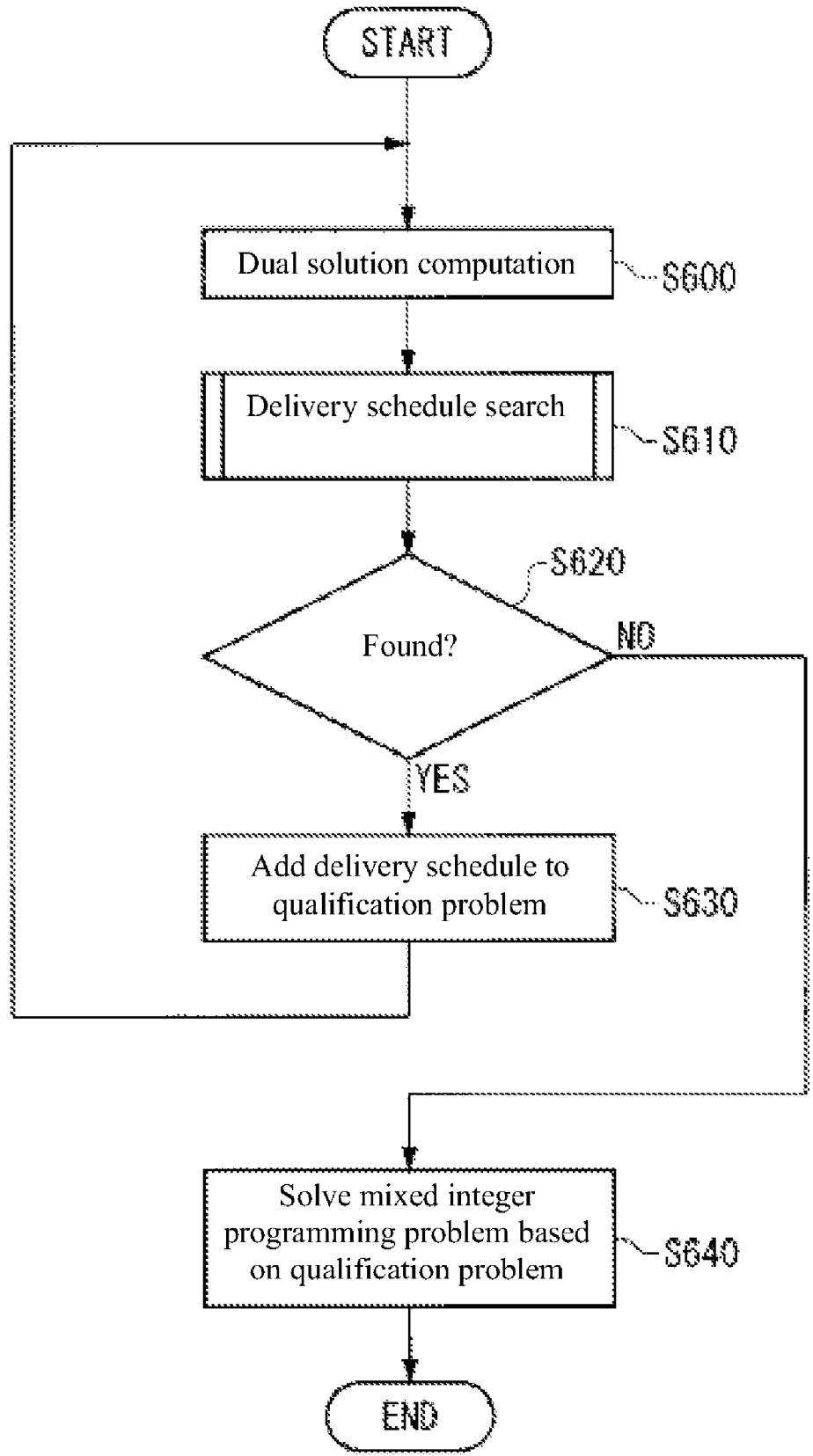
FIG. 6 shows a flowchart of the process that creates the purchasing and delivery plan by solving the mixed integer programming problem.

FIG. 6 shows a flowchart of the process that creates the purchasing and delivery plan by solving the mixed integer programming problem. The dual solution computation unit 400 computes the dual solution for the qualification problem for the linear relaxation problem (S600). The schedule search unit 410 creates the objective function for the dynamic programming problem based on the equation that constrains the dual solution based on the delivery schedule and searches for a delivery schedule that exhibits a constraint that the qualification problem violates by solving this dynamic programming problem. (S610). With the a schedule having been found as a condition (S620:YES), the schedule adding unit 420 adds that delivery schedule to the qualification problem and generates a new qualification problem by establishing it (S630). Furthermore, the schedule adding unit 420 has the dual solution for this new qualification problem calculated by returning to the process in S600.

On the other hand, with the condition of a delivery schedule not being found (S620: NO), the integer solution computation unit 430 computes and outputs the number of delivery means and the amount of the commodity to be purchased by solving the mixed integer programming problem based on the solution for the qualification problem (S640). Rather than include constraints based on all of the delivery schedules, the mixed integer programming problem includes constraints based only on the delivery schedules successively added by the schedule adding unit 420. Therefore, the scale of the mixed integer programming problem may be made smaller, and the processing may be made efficient. In addition, the mixed integer programming problem may be made even more efficient by using the real number solution for the qualification problem in convergence criteria.

Figure 7:
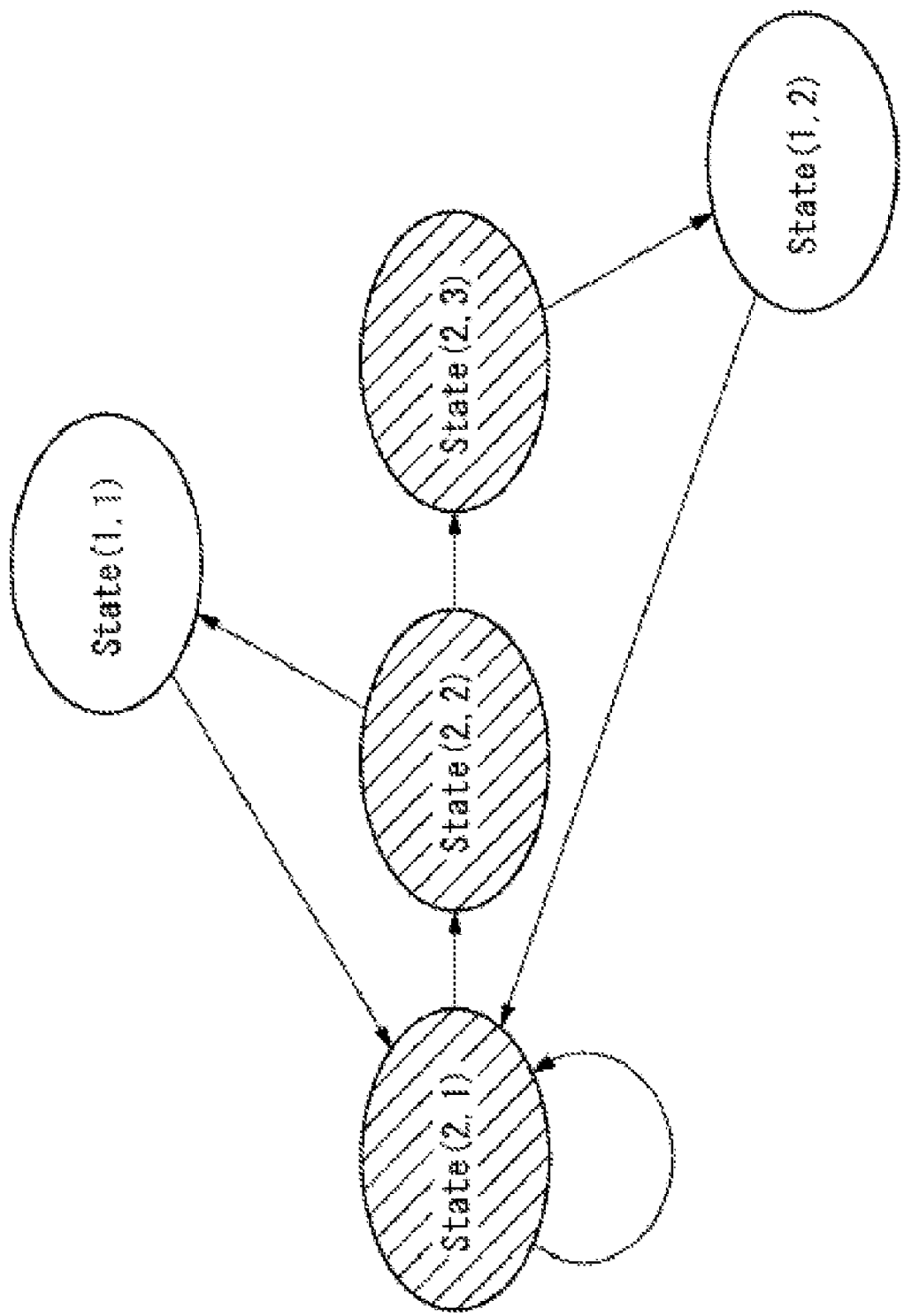
FIG. 7 shows an example of the transitions in the delivery state.

FIG. 7 shows an example of the transitions in the delivery state. The delivery states that the delivery means may assume will be described with reference to FIG. 7. The delivery states are divided into the following two types.

1. state $(1, j)$: state where purchase of the commodity from supplier j is complete.
 2. state $(2, t)$: state where the delivery means is delivering or not operating. Variable t shows the number of periods that have passed since departure. Here, the case of t=1 is included in the non-operating state. In addition, $1 \leq t \leq \max_j lt(j)-1$, and lt(j) shows the number of periods required for purchasing the commodity from supplier j.

There are the following four types of transitions in delivery state.
 1. state $(2, t-1) \rightarrow$ state $(2, t)$: state where delivery is progressing.
 2. state $(2, lt(j)-1) \rightarrow$ state $(1, j)$: transition from delivering to purchase completion
 3. state $(1, j) \rightarrow$ state $(2, 1)$: transition to next purchase or non-operating state
 4. state $(2, 1) \rightarrow$ state $(2, 1)$: continuation of state where the next delivery will not occur immediately As a specific example, FIG. 7 shows the transition in the delivery state for either supplier 1 or supplier 2 when the commodity is purchased. Letting the period required for purchasing the commodity from supplier 1 be 3 in FIG. 7, the period required for purchasing the commodity from supplier 2 is 4. The states with the crosshatching in the figure show delivery in progress, and the states without the crosshatching show states where delivery has been completed. When heading to supplier 1 for purchasing, state (2, 1) is the initial state, and the state changes to state (2, 2) with the passage of periods. Furthermore, the state changes to state (1, 1), the delivery is completed, and it returns to state (2, 1). On the other hand, when heading to supplier 2 for purchasing, state (2, 1) is the initial state, and the state changes to state (2, 2) and state (2, 3) with the passage of periods. Furthermore, the state changes to state (1, 2), the delivery is completed, and it returns to state (2, 1).

Figure 8:
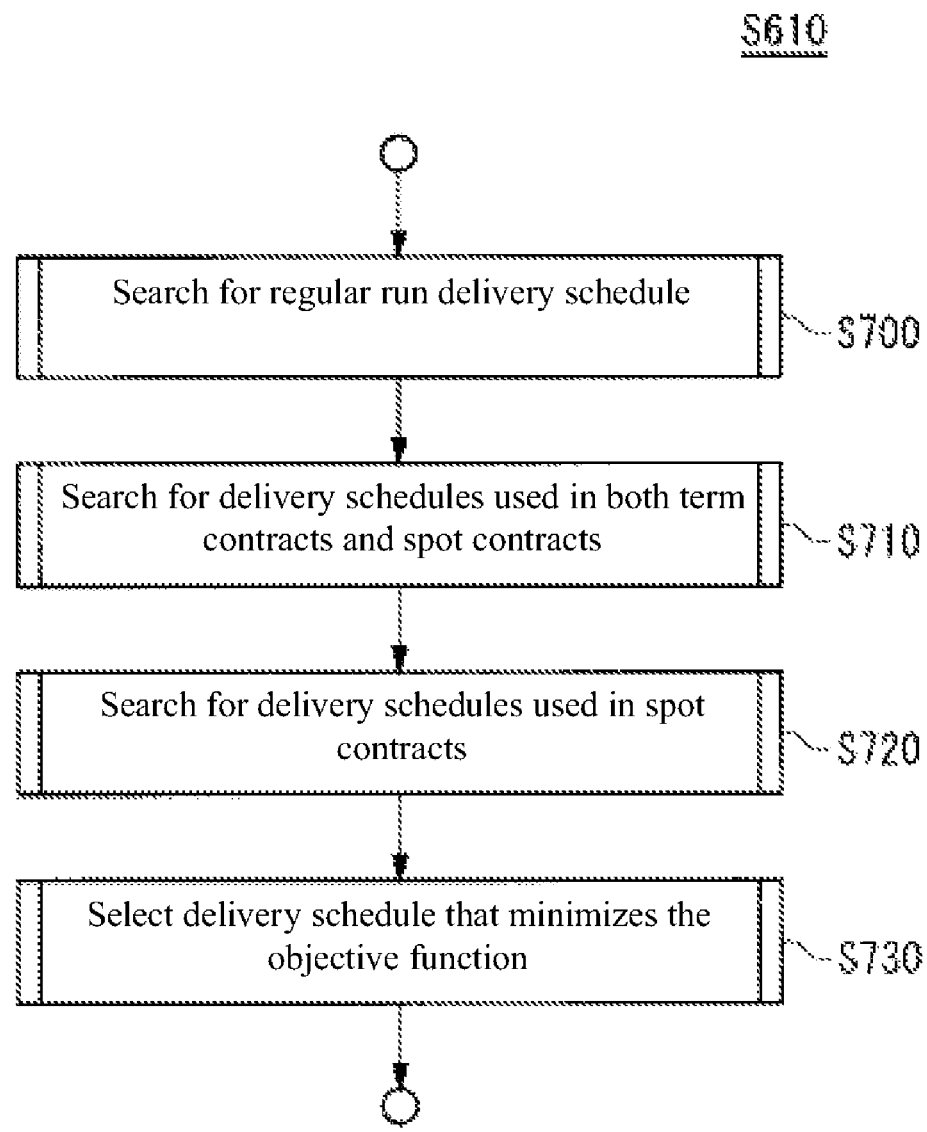
FIG. 8 shows the details of the processing in S610.

FIG. 8 shows the details of the processing in S610. As is shown in FIG. 8, the computation control unit 520 computes the minimum value for the second objective function for each of the plurality of types of delivery means when the commodity is delivered by that delivery means. Specifically, the schedule search unit 410 first searches for a delivery schedule that minimizes the second objective function out of the delivery schedules for delivering the term contract commodity by a routine run using dynamic programming (S700). The recursive equation used in this search is as follows. Here, the value for the second objective function based on the delivery state from period t to period T is cost (state, t).

$$\begin{aligned}
\text{cost}(\text{state}(1, j), T) &= \lambda^*_{liner\ ship} + (\text{value of lease for} \\
&\quad \text{a liner ship}) - A_j \sum_{s=1}^{S} \pi^*_{s,T} - \\
&\quad (\text{procurement volume for a delivery} \\
&\quad \text{operation}) \cdot \theta^*_j \\
\text{cost}(\text{state}(2, u), T) &= \lambda^*_{liner\ ship} + (\text{value of lease for a} \\
&\quad \text{liner ship}) \\
\text{cost}(\text{state}(1, j), t) &= \text{cost}(\text{state}(2, 1), t+1) - \\
&\quad A_j \sum_{s=1}^{S} \pi^*_{s,T} - (\text{procurement volume} \\
&\quad \text{for a delivery operation}) \cdot \theta^*_j \\
\text{cost}(\text{state}(2, u), t) &= \min(\text{cost}(\text{state}(2, u+1), t+1), \\
&\quad \min_{j: lt(j)=u-1} \\
&\quad \text{cost}(\text{state}(1, j), t+1))
\end{aligned} \quad (18)$$

The costs arising for the planning period as a whole are the ones arising in period T, which is the final period of the planning period. Therefore, as is shown in the first equation of Equation (18), the delivery costs accompanying the regular run are only generated in period T. Letting the size thereof be a constant determined in advance, it is expressed in the equation as (regular ship lease cost). This corresponds to $\eta_k$ on the right hand side of Equation (13). In addition, values that contribute to the value of the objective function regardless of the combination of delivery states are also seen as contributing to the objective function only in period T. That is, the value of the dual solution $\lambda_{g=regular\ run}$ contributes to the objective function only in period T. This corresponds to the second term on the right hand side of Equation (13). Besides this, the value based on the combination of delivery states is one that contributes to the objective function in for each delivery. That is, the delivery state contributes a value based on one delivery to the objective function in each transition on the delivery state from a delivery complete state to a delivery in progress state.

In addition, as is shown in the fourth equation in Equation (18), the schedule search unit 410 makes a selection for some supplier as to whether to head for [it for] purchasing to minimize the value of the second objective function calculated based on delivery from period t to period T, and computes the minimum value for the value of the second objective function when heading for that selected supplier for purchasing. In the number 4 [probably should be fourth, character error] equation in Equation (18), the state transition from state (2, u) to state (1, j) shows a purchase from some supplier that makes the required period for the purchase u−1. In addition, the state transition from state (2, u) to state (2, u+1) shows a purchase from another supplier requiring a larger required time than that.

Next, the schedule search unit 410 searches for a delivery schedule that minimizes the second objective function out of the delivery schedules that deliver the commodity for both term contracts and spot contracts by charter runs or runs by the company itself (S710). The recursive equation used in this search is as follows.

$$\text{cost}(\text{state}(1, j), T) = \lambda^*_{chartered\ ship} + lt(j) \cdot (\text{value of lease} \quad (19)$$
$$\text{of a chartered ship for a term}) -$$
$$A_j \sum_{s=1}^{S} \pi^*_{s,T} + \min(-(\text{procurement}$$
$$\text{volume for a delivery operation}) \cdot$$
$$\theta^*_j, sp(j, T))(\text{on condition of a}$$
$$\text{chartered ship})$$

$$\text{cost}(\text{state}(1, j), T) = \lambda^*_{own\ ship} + lt(j) \cdot (\text{operational cost}$$
$$\text{of an own ship for a term}) -$$
$$A_j \sum_{s=1}^{S} \pi^*_{s,T} + \min(-(\text{procurement}$$
$$\text{volume for a delivery operation}) \cdot$$
$$\theta^*_j, sp(j, T))$$
$$(\text{on condition of an own ship})$$

$$\text{cost}(\text{state}(2, u), T) = \lambda^*_{chartered\ ship}(\text{on condition of a}$$
$$\text{chartered ship})$$

$$\text{cost}(\text{state}(2, u), T) = \lambda^*_{own\ ship}(\text{on condition of an ownship})$$

$$\text{cost}(\text{state}(1, j), t) = \text{cost}(\text{state}(2, 1), t+1) + lt(j) \cdot$$
$$(\text{value of lease of a chartered ship}$$
$$\text{for a term}) - A_j \sum_{s=1}^{S} \pi^*_{s,t} + \min$$
$$(-(\text{procurement volume for a}$$
$$\text{delivery operation}) \cdot \theta^*_j, sp(j, t))$$
$$(\text{on condition of a chartered ship})$$

$$\text{cost}(\text{state}(1, j), t) = \text{cost}(\text{state}(2, 1), t+1) + lt(j) \cdot$$
$$(\text{value of lease of an own ship}$$
$$\text{for a term}) - A_j \sum_{s=1}^{S} \pi^*_{s,t} + \min$$
$$(-(\text{procurement volume for a}$$
$$\text{delivery operation}) \cdot (\theta^*_j, sp(j, t))$$
$$(\text{on condition of an own ship})$$

-continued
$$\text{cost}(\text{state}(2, u), t) = \min(\text{cost}(\text{state}(2, u+1), t+1),$$
$$\min_{j: lt(j) = u-1} \text{cost}(\text{state}(1, j), t+1))$$

Compared with Equation (18), the computation method for the value corresponding to $\eta_k$ in Equation (19) differs. That is, the fifth equation and sixth equation in Equation (19) show the determination of whether the purchase by either the term contract or the spot contract can make the value for the objective function smaller in period t targeting a new purchase. When the term contract is smaller, the value corresponding to the term δ in Equation (13) contributes to the objective function. That is, −(one purchase amount)·$\theta_j$ is added to the second objective function. On the other hand, when the spot contract is smaller, the value corresponding to the right side in Equation (13) contributes to the objective function. That is, the spot purchase cost sp(j, t) is added to the second objective function.

Next, the schedule search unit 410 searches for a delivery schedule that minimizes the second objective function out of the delivery schedules that deliver the commodity for spot contracts by charter runs or runs by the company itself (S720). The recursive equation used in this search is as follows.

$$\text{cost}(s, \text{state}(1, j), T) = \lambda^*_{chartered\ ship} + lt(j) \cdot (\text{value of lease} \quad (20)$$
$$\text{of a chartered ship for a term}) -$$
$$A_j \cdot \pi^*_{s,T} + sp(j, T)$$
$$(\text{on condition of a chartered ship})$$

$$\text{cost}(s, \text{state}(1, j), T) = \lambda^*_{own\ ship} + lt(j) \cdot (\text{operational}$$
$$\text{cost of an own ship for a term}) -$$
$$A_j \cdot \pi^*_{s,T} + sp(j, T)$$
$$(\text{on condition of an own ship})$$

$$\text{cost}(s, \text{state}(2, u), T) = \lambda^*_{chartered\ ship}(\text{on condition}$$
$$\text{of a chartered ship})$$

$$\text{cost}(s, \text{state}(2, u), T) = \lambda^*_{own\ ship}(\text{on condition of an}$$
$$\text{own ship})$$

$$\text{cost}(s, \text{state}(1, j), t) = \frac{1}{\sum_{s'' \in S(s,t)} p_{s''}} \cdot \sum_{s' \in S(s,t)} p_{s'} \cdot$$
$$(\text{cost}(s', \text{state}(2, 1), t+1) +$$
$$lt(j) \cdot (\text{value of lease of a chartered}$$
$$(\text{ship for a term}) - A_j \cdot \pi^*_{s,t} +$$
$$sp(j, T)(\text{on condition of a chartered}$$
$$\text{ship})$$

$$\text{cost}(s, \text{state}(1, j), t) = \frac{1}{\sum_{s'' \in S(s,t)} p_{s''}} \cdot \sum_{s' \in S(s,t)} p_{s'} \cdot$$
$$(\text{cost}(s', \text{state}(2, 1), t+1) + lt(j) \cdot$$
$$(\text{operational cost of an own ship}$$
$$\text{for a term}) - A_j \cdot \pi^*_{s,t} +$$
$$sp(j, T)(\text{on condition of an own}$$
$$\text{ship})$$

-continued $$\text{cost}(s, \text{state}(2, u), t) = \frac{1}{\sum_{s'' \in S(s,t)} p_{s''}} \sum_m \cdot \min$$

$$\left( \sum_{s' \in S(s,t,m)} p_{s'} \text{cost}(s', \right.$$

$$\text{state}(2, u+1), t+1), \min_{j:lt(j)=u-1}$$

$$\left. \sum_{s' \in S(s,t,m)} p_{s'} \text{cost}(s', \text{state}(1, j), t+1) \right)$$

Here, in this Equation (20), the set of demand scenarios that cannot be distinguished from demand scenario s in period t is S(s, t). That is, S(s, t) is a set of demand scenarios where the demand from the first period of the planning period to period t is the same as demand scenario s. In addition, the $m^{th}$ set when the set of demand scenarios that cannot be distinguished from demand scenario s in period t is divided into the sent of demand scenarios that cannot be distinguished even in the period t+1 is S(s, t)

Compared with Equation (18), the computation method for the value corresponding to $\eta_k$ in Equation (20) differs. That is, in the first equation, second equation, fifth equation and sixth equation in Equation (2) the purchase cost sp(j, T) for the spot contract is added to the second objective function when each delivery is completed. In addition, the fifth to seventh equation in Equation (20) is based on the unpredictability constraint for the demand scenario. That is, the recursive equation computation unit 510 computes the value for the second objective function which is based on the delivery state from period t to period T based on the expected value for the plurality of demand scenarios for the value of the second objective function which is based on the delivery state from the period t+1 to period T. The demand scenarios used in the computation are only those that cannot be distinguished from the demand from the first period of the planning period to period t, and other demand scenarios are not used.

Furthermore, the schedule selection unit 530 selects the smallest value from the values for the second objective function in the first period of the plurality of periods computed for each of this plurality of types of delivery means and selects a group of delivery states established for computing that value as the delivery schedule to be found (S730).

Figure 9:
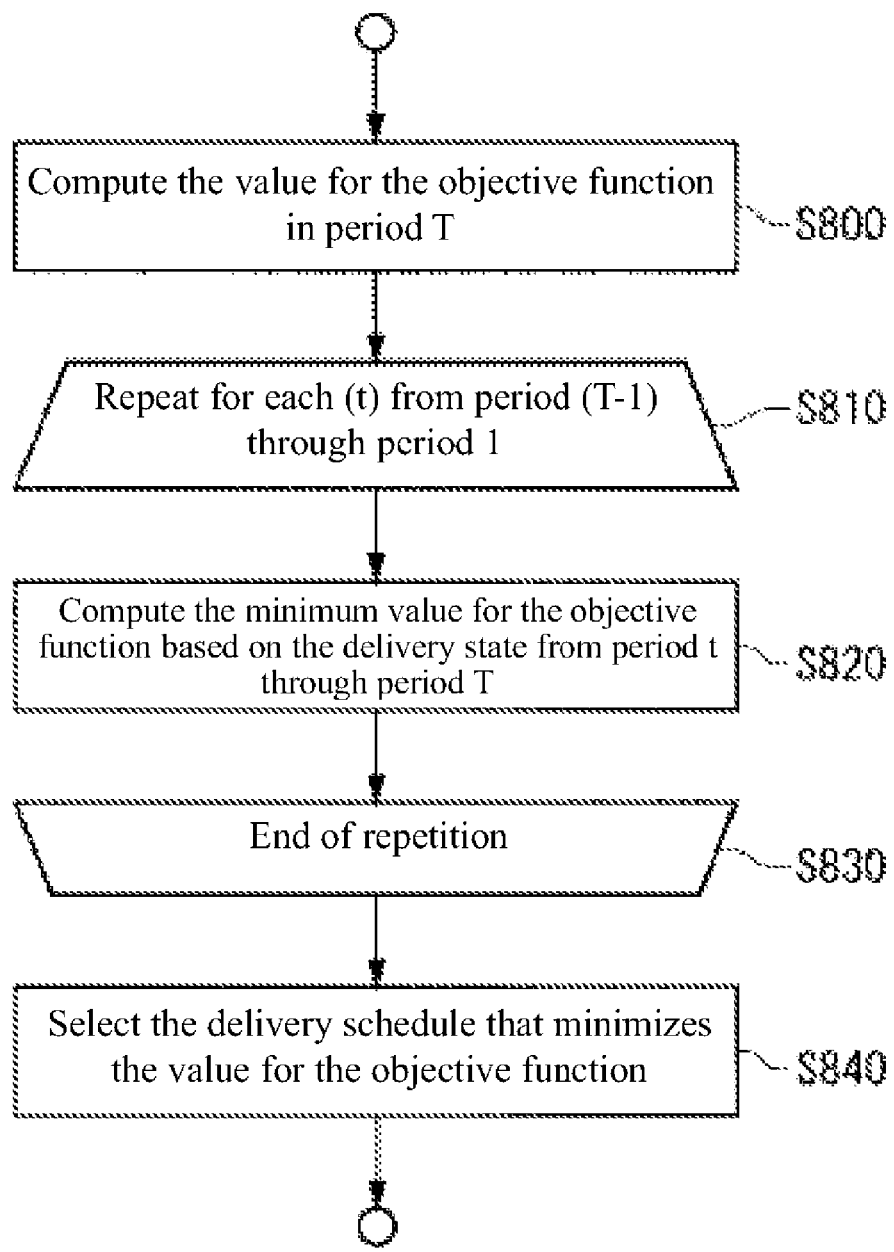
FIG. 9 shows the details of the processing in S700, S710 and S720.

FIG. 9 shows the details of the processing in S700, S710 and S720. In addition, FIG. 10 shows the details of the processing in S820. The plan creation system 40 proceeds with processing following the order shown in FIG. 9, and the results are recorded in a table with a structure like that in FIG. 10. An example of the table used in S700 and S710 is shown in the upper side of FIG. 10. An example of the table used in S720 is shown on the lower side of FIG. 10. The details of the processing that searches for delivery schedules will be described with reference to FIG. 9 and FIG. 10.

The initial value computation unit 500 computes the value for the second objective functions which is calculated based on the delivery state for the delivery means in period T for each of the plurality of delivery means (S800). That is, the initial value computation unit 500 computes the value of the second objective function which is calculated based on that delivery state only for the delivery means for the regular runs in S700. That is, the initial value computation unit 500 computes the value of the second objective function which is calculated based on that delivery means only for the delivery means for the charter runs and runs by the company itself in S710. That is, the initial value computation unit 500 computes the value of the second objective function which is calculated based on that delivery means only for the delivery means for the charter runs and runs by the company itself in S720.

For example, the initial value computation unit 500, as is shown in FIG. 10, computes the value for the second objective function arising because of the delivery state for each from state (1, 1) through state (1, J) in period T. In the example in FIG. 10, the value of the second objective function when the commodity is purchased from supplier 1 in period T is 100. In addition, the value of the second objective function when the commodity is purchased from supplier 2 in period T is 80. In addition, the value of the second objective function when the commodity is purchased from supplier j in period T is 50. In addition, the value of the second objective function when the commodity is purchased from supplier J in period T is 40. The first equation in Equation (18) is used in the computation of this value in S700, the first and second equations in Equation (19) used in S710, and the first and second equations in Equation 20 used in S720.

In addition, the initial value computation unit 500 computes the value for the second objective function arising because of the delivery state for each from state (2, 1) through state (2, U) in period T. For example, when there is a regular run and when the planning period has ended in a delivery in progress or non-operating state, delivery costs do not arise if only period T is focused on. Therefore, the value for the second objective function is 0 according to the delivery state for period T only. However, since, in the present embodiment, the amount of costs recorded through the entire planning period contribute to the value of the objective function in period T, the value of the objective function in the example in FIG. 10 is 10. In the computation of this value, the second equation in Equation (18) is used in S700, and the third and fourth equations in Equation (19) are used in S710.

Moreover, in S720, in addition to each of the suppliers, the initial value computation unit 500 also computes the second objective function arising because of the delivery state in period T for each delivery scenario. That is, the initial value computation unit 500 computes the value for the second objective function for each demand scenario s (1≦s≦S) when the delivery state is state (1, j) (1≦j≦J). In addition, the initial value computation unit 500 computes the value for the second objective function for each demand scenario s (1≦s≦S) when the delivery state is state (2, u) (1≦u≦U). The first through fourth equations in Equation (20) are used in computation of this value. This calculated value is, for example, recorded in the lower side of the table in FIG. 10.

Return to FIG. 9. Next, the computation control unit 520 repeats the following processing (S810) for each period (letting it be period t) from the period (T−1) directly before period T going backwards toward period 1. The recursive equation computation unit 510 computes the value for the second objective function which is calculated based on delivery from period t through period T for each of the plurality of types of delivery means based on the value for the second objective function which is calculated based on delivery from period t+1 through period T (820).

For example, the value for the objective function calculated in S800 is recorded in the rightmost column in the table in FIG. 10, as is shown in FIG. 10. Therefore, to find the value of the objective function which is calculated based on period (T−1) through period T, the value for the objective function arising in period (T−1) may be added to the value of the objective function arising in period T. The recursive equation computation unit 510 computes the value of the objective function for each of all of the delivery states assumable in period (T−1) arising because of a state transition from that delivery state to each delivery state in period T. Furthermore, the recursive equation computation unit 510 selects the delivery state in period T for which that value is the smallest and records the value of the objective function arising because of the transition to that state. Furthermore, the recursive equation computation unit 510 may record whether there should be a transition to a delivery state in period T to make the objective function that value. In the computation of this value, the third and fourth equations in Equation (18) are used in S700, and the fifth through seventh equations in Equation (19) are used in S710. Moreover, in S720, the value of the objective function is further computed for each of the plurality of demand scenarios. The fifth through seventh equations in Equation (20) are used in computation of this value.

Return to FIG. 9. The calculation control unit 520 repeats the processing above for each period t (S830). The schedule selection unit 530 selects the delivery schedule making the value for the second objective function based on the delivery state from period 1 through period T the smallest (S840). Specifically, the schedule selection unit 530 scans the leftmost column in the table shown as an example in FIG. 10 and selects the smallest value. Furthermore, to calculate that value, the schedule selection unit 530 selects the combination of delivery states that the delivery means should allow as the delivery schedule.

Figure 11:
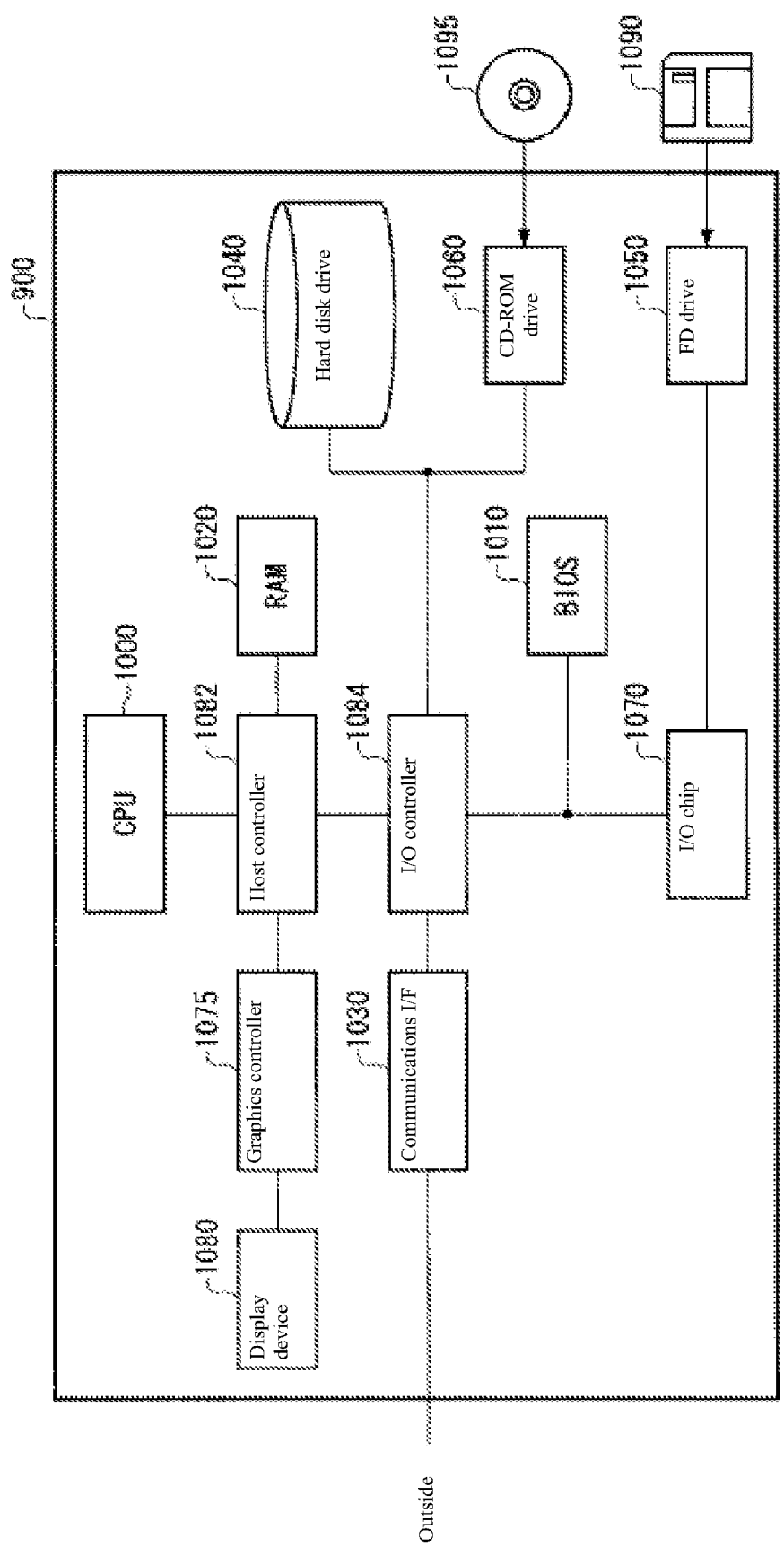
FIG. 11 shows an example of the hardware constitution for an information processing device 900 that functions as the plan creation system 40.

FIG. 11 shows an example of the hardware constitution for an information processing device 900 that functions as the plan creation system 40. The information processing device 900 is provided with a CPU peripheral unit having a CPU 1000, RAM 1020 and a graphics controller 1075 interconnected by a host controller 1082, an input/output unit having a communications interface 1030, hard disk drive 1040 and CD-ROM drive 1060 connected to the host controller 1082 by an input/output controller 1084, and a legacy input/output unit having a BIOS 1010, flexible disk drive 1050 and output chip 1070 connected to the input/output controller 1084.

The host controller 1082 connects the RAM 1020, the CPU 1000 that accesses the RAM 1020 at a high transfer rate and the graphics controller 1075. The CPU 1000 operates based on a program stored in the BIOS 1010 and the RAM 1020 and controls the various parts. The graphics controller 1075 acquires image data the CPU 1000 and the like generates in a frame buffer provided in the Ram 1020 and displays it on a display device 1080. As a substitute for this, the graphics controller 1075 may internally include the frame buffer that stores the image data generated by the CPU 1000 and the like.

The input/output controller 1084 connects the host controller 1082 and the communications interface 1030, which is a comparatively high speed input/output device, the hard disk drive 1040 and the CD-ROM drive 1060. The communications interface 1030 communicates with external devices through a network. The hard disk drive 1040 stores the programs and data that the information processing device 900 uses. The CD-ROM drive 1060 reads programs and data from a CD-ROM 1095, and provides [them] to the RAM 1020 and the hard disk 1040.

In addition, the BIOS 1010 and the comparatively low speed input/output devices such as the flexible disk drive 1050 and the input/output chip 1070 are connected in the input/output controller 1084. The BIOS 1010 stores a boot program that the CPU 1000 executes during startup of the information processing device 900, programs dependent on the information processing device 900 hardware and the like. The flexible disk drive 1050 reads programs or data from a flexible disk 1090, and provides [them] to the RAM 1020 or hard disk drive 1040 through the input/output chip 1070. The input/output chip 1070 connects the flexible disk 1090 and, for example, various input and output devices through parallel ports, serial ports, keyboard ports, mouse ports and the like.

The programs provided to the information processing device 900 are stored in storage media such as the flexible disk 1090, CD-ROM 1095 or an IC card. The programs are read from the storage media through the input/output chip 1070 and/or the input output controller 1084, installed in the information processing device 900 and executed. The operations carried out by working the information processing device 900 and the like are the same as the operations in the plan creation system 40 described in FIG. 1 through FIG. 10, so descriptions will be omitted.

The programs shown above may be stored in external storage media. Besides the flexible disk 1090 and CD-ROM 1095, an optical storage medium such as a DVD, PD or the like, a magnetic storage medium such as an MD, tape media, a semiconductor medium such as an IC card or the like may be used for the storage media. In addition, storage devices such as hard disks, RAM and the like provided in server systems connected to a dedicated communications network or the Internet may be used as the storage media and programs provided to the information processing device 900 through a network.

As has been described above with reference to FIG. 1 through FIG. 11, the calculation time required for finding an optimal solution may be reduced by gradually expanding a small qualification problem and finding the optimal solution for a linear relaxation problem according to the plan creation system 40. In addition, finding the optimal solution is achieved through rapid processing using dynamic programming. By this means a plan that includes the purchasing contracts and delivery contracts for a commodity and considers a plurality of demand scenarios may be created more efficiently than up to now.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A system for creating plans for procuring a commodity from a supplier and delivering to a prospective consumer, the system configured to solve a mixed integer programming problem that has as variables the number of delivery means for delivering said commodity according to a delivery schedule and the amount of said commodity purchased from said supplier, the system comprising:

a memory; and at least one processor coupled to the memory and configured to implement:

a dual solution computation unit that in a linear relaxation problem for said mixed integer programming problem, creates a qualification problem that is limited to at least one preset delivery schedule and computes a dual solution for said qualification problem;

a schedule search unit that creates an objective function based on a constraint equation that constrains the dual solution of the constraint equations for the dual problem of said linear relaxation problem by the delivery schedules and searches for a delivery schedule exhibiting the constraints that violate the dual solution of said qualification problem by solving a dynamic programming problem having a recursive equation that shows the changes in said objective function value for the changes in the delivery states;

a schedule adding unit that creates a new qualification problem by adding and setting said delivery schedule that has been found in said qualification problem with the finding of said delivery schedule as a condition and computes a dual solution to said new qualification problem using said dual solution computation unit; and an integer solution computation unit that computes and outputs the number of said delivery means and the amount of said commodity to be purchased by solving said mixed integer programming problem based on the solution of said qualification problem with said delivery schedule not being found as a condition.

2. The system according to claim 1 wherein:

said at least one processor further sets as variables the amount of the commodities sold to said prospective consumer out of said commodity purchased in each period and the inventory amount of said commodity not sold to said prospective consumer even though it has been transported;

said at least one processor configured to subtract the value of the difference when the amount of said commodity sold to said prospective consumer from the amount of said commodity that has been delivered by said delivery means said period in each of a plurality of periods includes an inventory transition constraint showing an equivalency to the increase in the inventory amount of said commodity in said period, wherein each delivery schedule shows whether or not delivery of said commodity within said period is complete for each of said plurality of periods;

said dual solution computation unit computes a dual solution corresponding to said inventory transition constraint for each period in said qualification problem; and said schedule search unit searches for delivery schedules exhibiting constraints that the dual solution of said qualification problem violates by solving the dynamic programming problem that has an equation that constrains said dual solution calculated for each period based on the delivery schedule set as said objective function.

3. The system according to claim 2 wherein:

said at least one processor configured to compute said inventory transition constraint corresponding to each of a plurality of demand scenarios that have determined the demand for said commodity in each of said plurality of periods, wherein each delivery schedule shows whether or not the delivery of said commodity has been completed in said period and for said demand scenario corresponding to each of said plurality of periods and each of said plurality of demand scenarios;

said dual solution computation unit further computes a dual solution corresponding to said inventory transition constraint for said qualification problem for each said demand scenario; and said schedule search unit searches for delivery schedules exhibiting constraints that the dual solution of said qualification problem violates by solving the dynamic programming problem that has an equation that constrains said dual solution calculated for each period based on the delivery schedule set as said objective function.

4. The system according to claim 2 wherein:

said at least one processor configured to compute a delivery means total number constraint showing that in each type of said delivery means, wherein the total number of said delivery means used in each delivery schedule is not greater than an upper limit for said delivery means that has been established in advance, and wherein each delivery schedule shows the type of delivery means delivering said commodity according to said delivery schedule;

said dual solution computation unit computes the dual solution corresponding to said delivery means total number constraint for said qualification problem for each type of said delivery means; and said schedule search unit searches for delivery schedules exhibiting constraints that the dual solution of said qualification problem violates by solving the dynamic programming problem that has an equation that constrains said dual solution corresponding to said delivery means total number constraint along with a dual solution corresponding to said inventory transition constraint set as said objective function.

5. The system according to claim 2 wherein:

said at least one processor configured to compute a purchase amount constraint showing that the amount of said commodity purchased from each of said suppliers is equal to the amount where the amount of said commodity delivered by one delivery means according to each delivery schedule multiplied by the number of said delivery means delivering said commodities according to said delivery schedule;

said dual solution computation unit computes a dual solution corresponding to said purchase amount constraint for said qualification problem for each supplier of said commodity;

said schedule search unit searches for delivery schedules exhibiting constraints that the dual solution of said qualification problem violates by solving the dynamic programming problem that has an equation that constrains said dual solution corresponding to said purchase amount constraint along with a dual solution corresponding to said inventory transition constraint set as said objective function.

6. The system according to claim 2 wherein said schedule search unit expresses dual solution constraints based on delivery schedule as an inequality setting a function value greater than or equal to a constant value and searches for delivery schedules that minimize the value of said function, with an equation substituting the dual solution of said qualification problem into said function as said objective function through dynamic planning.

7. The system according to claim 6 wherein:
said schedule search unit has an initial value computation unit that computes the value of said second objective function that is calculated based on the delivery states for the delivery means in a final period T in said plurality of periods;
wherein the at least one processor is further configured to implement:
a recursive equation computation unit that computes the minimum value for said objective function calculated based on the delivery states from a certain period t in said plurality of periods to the final period T that is based on said recursive equation based on the minimum value for said objective function calculated based on the delivery states from the period t+1 following said period t to period T;
a computation control unit that has said initial value computation unit calculate the value for said objective function for each delivery state and has the values for said objective function when each delivery state for said delivery means is established for each period calculated in order from said period T toward the first period of said plurality of periods by said recursive equation computation part, and
a schedule selection unit that selects a combination of delivery states established in each period for minimizing the value of said objective function in the first period of said plurality of periods as the delivery schedule to be found.

8. The system according to claim 7 wherein:
each delivery schedule shows a schedule for delivering said commodity by any of the plurality of types of delivery means for which a fee schedule for the delivery cost differs;
said at least one processor configured to compute a constraint for said dual solution by the delivery cost as a constraint on the dual solution based on said delivery schedule; and
wherein said initial value computation unit computes said objective function of each of the plurality of types of delivery means;
said recursive equation computation means computes the value of said objective function, which is calculated based on delivery from said period t to said period T, for each of said plurality of types of delivery means base, based on the value of said objective function calculated based on delivery from said period t+1 to period T;
said computation control unit has the value for said objective function calculated in the case where each delivery state is set in said delivery means in each period for each of said plurality of types of delivery means; and
said schedule selection unit selects the smallest value from the values for said objective function in the initial period of said plurality of periods calculated for each of said plurality of types of delivery means and selects a combination of delivery states established for calculating said value as the delivery schedule to be found.

9. The system according to claim 7 wherein:
said at least one processor configured to compute said inventory transition constraint corresponding to each of a plurality of demand scenarios that have determined the demand for said commodity in each of said plurality of periods;
each delivery schedule includes information showing whether or not the delivery of said commodity has been completed in said period and for said demand scenario corresponding to each of said plurality of periods and each of said plurality of demand scenarios; and
wherein said recursive equation computation unit computes the value of said objective function, which is based on the delivery states from said period t to said period T, based on an expected value for said objective function based on the delivery states from said period t+1 to said period T for a plurality of demand scenarios that cannot be separated from the demand from the first period of said plurality of periods to said period t for the value.

10. The system according to claim 7 wherein:
the period required for delivering said commodity from a plurality of said suppliers to an inventory location differs for each supplier; and
wherein said recursive equation computation unit selects whether to aim at purchasing from some supplier to minimize the value of said objective function, which is calculated based on delivery from said period t to said period T, based on the minimum value for said second objective function calculated based on delivery from said period t+1 to said period T and computes the minimum value for the value of said second objective function when aiming at supply from said supplier that has been selected.

11. A method for creating plans for procuring commodities from a supplier and delivering to a prospective consumer, the method configured to solve a mixed integer programming problem that has as variables a number of delivery means for delivering said commodities according to a delivery schedule and an amount of said commodities purchased from said supplier, the method comprising:
creating via a dual solution computation unit, in a linear relaxation problem for said mixed integer programming problem, a qualification problem that is limited to at least one preset delivery schedule and computes a dual solution for said qualification problem;
creating via a schedule search unit an objective function based on a constraint equation that constrains the dual solution of the constraint equations for the dual problem of said linear relaxation problem by the delivery schedules and searches for a delivery schedule exhibiting the constraints that violate the dual solution of said qualification problem by solving a dynamic programming problem having a recursive equation that shows the changes in said objective function value for the changes in the delivery states;
creating via a schedule adding unit a new qualification problem by adding and setting said delivery schedule that has been found in said qualification problem with the finding of said delivery schedule as a condition and computes a dual solution to said new qualification problem; and
computing and outputting via an integer solution computation unit the number of said delivery means and the amount of said commodity to be purchased by solving said mixed integer programming problem based on the solution of said qualification problem with said delivery schedule not being found as a condition; and
wherein all steps of the method are performed by at least one processor.

12. A program embodied in non-transitory computer readable medium having computer readable instructions embedded therein which when executed by at least one processor, causing said processor to implement a method for creating plans for procuring a commodity from a supplier and delivering to a prospective consumer, the method configured to solve a mixed integer programming problem that has as variables the number of delivery means for delivering said commodity according to a delivery schedule and the amount of said commodity purchased from said supplier, the computer readable instructions comprising:
- a dual solution computation unit that in a linear relaxation problem for said mixed integer programming problem, creates a qualification problem that is limited to at least one preset delivery schedule and computes a dual solution for said qualification problem;
- a schedule search unit that creates an objective function based on a constraint equation that constrains the dual solution of the constraint equations for the dual problem of said linear relaxation problem by the delivery schedules and searches for a delivery schedule exhibiting the constraints that violate the dual solution of said qualification problem by solving a dynamic programming problem having a recursive equation that shows the changes in said objective function value for the changes in the delivery states;
- a schedule adding unit that creates a new qualification problem by adding and setting said delivery schedule that has been found in said qualification problem with the finding of said delivery schedule as a condition and computes a dual solution to said new qualification problem using said dual solution computation unit; and
- an integer solution computation unit that computes and outputs the number of said delivery means and the amount of said commodity to be purchased by solving said mixed integer programming problem based on the solution of said qualification problem with said delivery schedule not being found as a condition.

13. A method for supplying a service for creating plans for procuring commodities from a supplier and delivering to a prospective consumer, the method configured to solve a mixed integer programming problem that has as variables the number of delivery means for delivering said commodities according to the delivery schedule and the amount of said commodities purchased from said supplier, the method comprising:
- creating by at least one processor a qualification problem that is limited to at least one preset delivery schedule and computes a dual solution for said qualification problem;
- creating via a schedule search unit an objective function based on a constraint equation that constrains the dual solution of the constraint equations for the dual problem of said linear relaxation problem by the delivery schedules and searches for a delivery schedule exhibiting the constraints that violate the dual solution of said qualification problem by solving a dynamic programming problem having a recursive equation that shows the changes in said objective function value for the changes in the delivery states;
- creating via a schedule adding unit a new qualification problem by adding and setting said delivery schedule that has been found in said qualification problem with the finding of said delivery schedule as a condition and computes a dual solution to said new qualification problem; and
- computing and outputting via an integer solution computation unit the number of said delivery means and the amount of said commodities to be purchased by solving said mixed integer programming problem based on the solution of said qualification problem with said delivery schedule not being found as a condition, wherein all steps of the method are performed by the at least one processor.

* * * * *